May 18, 1965 J. PAVLECKA 3,184,013
INTERLOCKED PANEL STRUCTURE
Filed Nov. 4, 1952 2 Sheets-Sheet 1

May 18, 1965  J. PAVLECKA  3,184,013
INTERLOCKED PANEL STRUCTURE
Filed Nov. 4, 1952  2 Sheets-Sheet 2

United States Patent Office 3,184,013
Patented May 18, 1965

3,184,013
INTERLOCKED PANEL STRUCTURE
John Pavlecka, 8797 Capital Ave., Oak Park 37, Mich.
Filed Nov. 4, 1952, Ser. No. 318,692
32 Claims. (Cl. 189—34)

This invention relates to a structure for walls, floors, partitions, roofs and doors in buildings and dwellings, and to decks, bulkheads, van and bus bodies, billboards, platforms, aircraft frames and airfoil bodies, etc., and more particularly to a panel structure the components of which are interlocked into unity by linear keys of a profile consisting of a central web with multiple reentrant lengthwise tenons on both of its sides.

One object of this invention is a structure for a large variety of purposes, of either a closed perimeter or of an indefinite extent and of a width rendering its interior inaccessible, which is assembled of individual panel units and in some cases also of individual stress members, by the insertion of interlocking keys of a two-sided tenoned profile into its interior through one open end, and which can be disassembled for inspection, repair, or transfer, with equal facility by the withdraw of such keys.

A further object is the elimination from both the fabrication and the assembly of a structure with an inaccessible interior of such hardware as nails, screws, and particularly rivets, by fabricating it with complete accessibility as individual panel units, or panel units and separate stress members, with the use of such processes as adhesive bonding and resistance welding, and assembling it by telescoping into it a number of two-sided tenoned keys, thereby saving time and labor and, moreover, obtaining a flawless exterior as is essential for appearance in all structures and for smoothness and accuracy in aircraft bodies and wings.

Another object is a structure affording all of the foregoing properties and, moreover, distinguished in that it makes use of stringers not only in their usual function as stress members but also as the conjoining agents; according to this provision of my invention, stringers on panel units associated in various relationships, or stringers on panel units associated with individual stress members, are interlocked with one another or with the stress members by linear keys made either of a strong material to provide additional reinforcements, or of a heat non-conducting material to act as barriers against heat dissipation or absorption through a wall.

Yet another object is an interiorly inaccessible structure in which, in contrast to existing structures, the widest available panels can be used for the outer surfaces and the number of seams reduced thereby, and those seams that are present are not only closed tightly and flush but are sealed against entry of elements by sealing strips deposited directly over or in the proximity of the seams, and are made to function effectively due to compression exerted upon them by the stringers that hold the structure together through their engagement with linear keys having a two-sided tenoned profile.

A specific object of my invention is the provision of individual panel units as the primary components of a structure, such units bearing stringers along two of their concomitant edges and at intervals apart therefrom, which stringers serve not only as stress members but also as the carriers of either frontal or lateral, or both front and lateral faces with reentrant mortises running lengthwise therein; such stringers are placed in confronting proximate juxtaposition of their lateral faces on adjoining panel units, and/or in confronting proximate opposition of their frontal faces on panel units spaced apart and facing one another, or on panel units and on individual stress members associated with them, and are constrained in these relationships and conjoined into unity by linear keys of a profile defined by a central web and reentrant tenons running lengthwise on both faces thereof, also known as the "inclave" profile; the key web fits into the gap between the proximate stringer faces as the key tenons are slid into an interfit and engagement with the mortises therein. This principle is herein further disclosed first in its entirety and then as applied to numerous useful embodiments.

Referring first collectively to all the figures in the drawings which form an integral part of this specification, the embodiments represented therein all make use of substantially the same characteristic structural union between associated components; in all of them, the outer surface of a structure is provided by at least one, and usually two or more panel units either in flush coplanar or right-angle relationship with one another; proximate to the inner surface of the panel unit or units are disposed associated structural members which may be either individual stress members, such as joists, studs, beams, spars, etc., or they may be panel units in a row parallel to or even at right angles to the first one; it is obvious that when individual stress members are used, another row of such panel units may also run along and proximate to their other extremities.

In order to effect a rigid yet separable union between the panel units themselves at their parting lines as well as between them and the associated members, each panel unit is provided with auxiliary stress members in the form of standing walls, or preferably with stringers which run lengthwise thereon, one at and along each panel limit or parting line—hereinafter identified as "edge" stringers—and others at intervals apart therefrom and designated "intermediate" stringers; these two types of stringers, or any wall means equivalent to them, in addition to sustaining stresses in the structure in all directions either alone or with the assistance of individual stress members, function as the carriers of instrumentalities for integrating the panel units with each other as well as with the members associated with them.

These instrumentalities carried by both the intermediate and the edge stringers and by the structural members opposedly alined therewith—be they either stringers of either type on a spaced panel unit row, or individual stress members—are formed with frontal faces and with a number, i.e., one or more, of mortises running lengthwise therein and having reentrant flanks; each two opposed stringers, or a stringer and a stress member, are in a confronting and proximate relationship of their mortised faces, and into the gap between them and into the motises in them is telescoped endwise a linear key the profile of which is constant; it consists of a central web and on both of its sides plural longitudinal tenons with reentrant flanks; there are several tenon and mortise profiles possessing such flanks, such as dovetail, bulbous, round, etc. As the key web comes into contiguity of its sides with the stringer and stress member confronting faces, these key tenons interfit slidably with the mortises therein and lock these parts into unity.

At the panel parting lines, each of the juxtaposed edge stringers thereat has its frontal face of a width only one half of that on the intermediate stringers, and the number of the mortises in that face is only one half of that on the latter stringers, whereby two such edge stringers jointly provide an equivalent of one intermediate stringer, and can be opposedly alined with one such stringer, or with an individual stress member, and interlocked by one tenoned key with each other; furthermore, two such edge stringers can be opposedly alined with two like edge stringers as equivalents of one intermediate stringer, and can be interlocked with them, as well as the stringers in each pair interlocked with each other, by the same key.

The significance of this principle of equivalency and interchangeability of two juxtaposed edge stringers with an intermediate one, or with a stress member, is fundamental for universal applicability of this new structure since the same key that locks into unity two spaced apart facing panel units can also lock together three such panel units in a facing and an adjoining relationship, and can lock together as many as four of such panel units in those relationships; in consequence, the parting lines in two panel unit rows constituting a structure are independent of one another as far as their locations are concerned and may be in a random coinciding and non-coinciding occurrences; this fact allows the use of panel units of different widths in continuity with one another in walls, the location of the parting lines in preferred places, and makes it feasible to construct right-angle intersections in walls.

Besides the primary function of the tenoned key to lock juxtaposed stringers to each other, and to lock such stringers or an intermediate stringer to a structural memmember or members, such as other stringer or stringers, it functions also as a heat insulator between the interlocked parts of a wall; furthermore, it is devised to cause the interlocked parts to coact with each other as a unitary stress member for their wall; to this end, the key web fits between the marginal corners on the opposite parts, or else is provided with only two half-tenons thereat, which half-tenons are in engagement with half-mortises at the corners of the opposite parts; the resulting wide span of engagement and abutment between the key and the interlocked parts, close to their extreme width, minimizes the effect of the looseness necessary for a sliding fit, and causes the interlocked parts to hold and support their panels relatively immovably.

A number of embodiments of the foregoing principles of interlocking wall structures by means of tenoned keys is described hereinfurther with reference to each figure in the drawings.

In the drawings.

FIG. 1 is a profile view of a portion of a structure, partially disassembled, in which panel units are interlocked in adjoining and in spaced apart facing relationships by stringers and tenoned keys;

FIG. 2 is a structural union of panel units by means of stringers in juxtaposition and opposition to one another and a tenoned key, the tenons on the key faces being in a staggered relationship to one another;

FIG. 3 shows a union of stringers on panel units by a tenoned key, the stringers being of the "hat" profile;

FIG. 4 is a perspective view of a building wall, partly sectionalized, in which stringers interlocked by tenoned keys hold panel units together and function as studs in the wall;

FIG. 5 is a profile view of a structural union of panel units employing edge and intermediate stringers of the "box" type;

FIG. 6 is a portion of a panel structure, partially disassembled, embodying stringers of both kinds of the single web type;

FIG. 7 represents a structural union in which stringers of the "hat" type as well as the tenoned key interlocking them are formed of rolled sheet stock;

FIGS. 8 and 9 are structural unions in which the associated stringers are in engagement with square and round tenons, respectively, on the tenoned keys therein;

FIG. 10 is a plan view of a building wall such as the one in FIG. 4, and shows diagonally positioned stringers for conjoining panel units at right angles to one another at wall intersections;

FIGS. 11 to 22 all show structures or structural unions wherein individual stress members are associated and interlocked with stringers on one or more of rows of panel units;

Figures 1, 2, 3, 4, 5, 6, 7, 8:
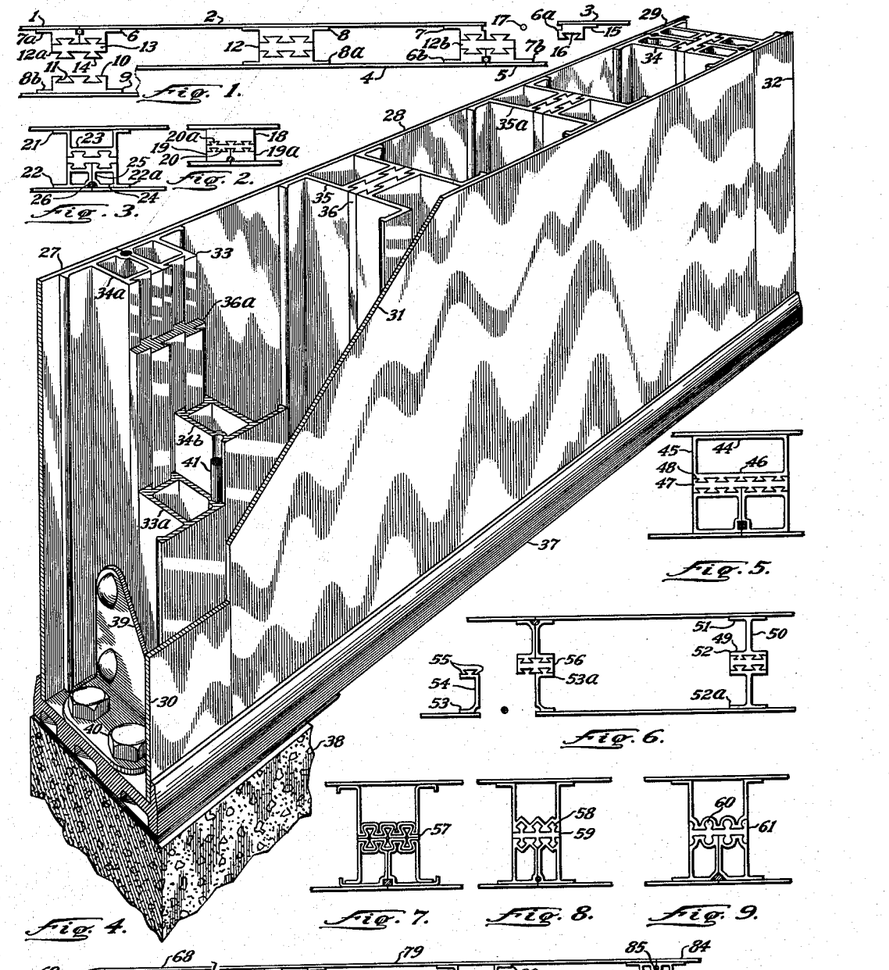

Certain of the components that distinguish all embodiments of my new structure are represented in FIG. 1, and include panel units 1–2–3 and 4–5 disposed in two spaced apart parallel rows; each panel unit consists primarily of a panel which provides the outer surface of a structure, edge stringers 6 and 7 which extend on it at and along two of its concomitant edges, and in most cases also intermediate stringers such as 8 which extend on it at intervals apart from the edge stringers. The profile of the intermediate stringers includes coplanar attaching flanges such as 9, and between them a body rising to a frontal face 10 away from the panel and having a number of mortises 11 running lengthwise therein; these mortises may be of any geometrical or irregular shape, but in all cases are characterized by inwardly divergent or reentrant flanks such as in the generally referred to as "dovetail" shape as shown. Oppposedly alined with the stringer 8 is a stringer 8a of an identical profile on a facing panel unit and in such a relationship that the stringer frontal faces are proximate to each other; into the gap between these faces is telescoped a linear key 12 the profile of which consists of a central web 13 which occupies the gap, and on both frontal faces of which run lengthwise tenons 14 with reentrant flanks; as shown in this and in the other embodiments in the drawings, the thickness of the web 13 may range from about one half the height of the tenons thereon in keys made of sheet material, as in FIG. 7, to the height of the tenons, or more, in extruded keys, depending upon the strength of material and, in some embodiments, upon its insulating properties. In width, the key web 13 is equal to that of the stringer faces between their corners whereby it provides the widest base available for abutment of the stringers against the key for relative immobility of the stringers in their function as a untary stress member; by having its tenons interfitted as slidably with the stringer mortises, the key 12 locks both stringers 8 and 8a and their panel units 2 and 4 to one another.

The edge stringers 6 to 6b and 7 to 7b are all of an identical profile, each amounting to one half of the intermediate stringer 8 in that it has an attaching flange 15 which supports a body between two lateral walls one of which coincides with the panel parting plane, and has a frontal face in which runs lengthwise a number but at least one mortise 16 with reentrant flanks; when the panel units 2 and 3 are alined with each other at the parting line, the edge stringers 7–6a thereon jointly constitute an equivalent of the intermediate stringer 8, and a tenoned key 12b identical with the key 12 locks them into unity with any stringer or stringers frontally alined therewith, such as with two other edge stringers 6b–7b on panel units 4–5, or with an intermediate stringer as in the union between stringers 6–7a and 8b on the respective panel units 2–1 and 4. The lateral face of the edge stringers at the parting plane has a longitudinal groove running therein, and a sealing strip 17 is deposited in the grooves of each two edge stringers on adjoining panel units, and is compressed thereby due to the constraining hold of the key on them.

It is evident that due to the above disclosed principle of equivalency and interchangeability of one intermediate and two edge stringers it is possible to assemble panel units into structures of any extent and shape, and a union between three stringers representing those types on three panel units in adjoining and facing relationships, such as the union of the stringers 6–7a and 8b in FIG. 1, contains the principal components of a structure and is fully representative of it; a number of such unions, differing from one another mainly in features engendered by the use of various geometrical shapes, proportions, or fabricating origin, is represented in the figures that follow.

The union in FIG. 2 illustrates one variation in that the stringers 18 and 19–19a in it do not include any flanges in their profile; this is in conformity with the definition of a stringer as a renforcng agent or an auxiliary stress member for a panel, and any member regardless of its profile that performs that function and at the same time functions as the carrier for interlocking mortises, i.e., as a conjoining agent, is in purview of this invention. Another variation resides in that the tenons 20 and 20a on the opposite faces of the key are staggered in relation to one another so that on one side of the key two half-tenons run along its edges; such a staggered relationship of the tenons necessitates two kinds of the intermediate stringers and two kinds of the edge stringers should they be required to fall into random opposition with one another.

Stringers 21 and 22–22a in the union of FIG. 3 are of the well known "hat" profile which is eminently suited as the carrier in its cross-web 23 of lengthwise mortises; the edge stringers are each one half of a bisected intermediate one, and in addition include a base 24, a lateral wall 25 at the parting plane, and a groove at the panel parting line for a sealing strip 26.

An application of the structural principles disclosed hereinabove to a building wall is exemplified in FIG. 4; panel unit rows 27–28–29 and 30–31–32 form the outer sides of the wall as well as studs therebetween; each panel unit is provided with edge stringers 33 and 34, and with a number of intermediate stringers 35 and 35a of the "hat" type; the stringers on the spaced apart panel unit rows are in opposed alinement with one another and are proximate to one another at their frontal faces, and are in a mortise-and-tenon engagement with tenoned keys 36 therebetween; when made of a heat non-conducting material, these keys function most effectively as barriers in the wall against heat transfer both into and out of a building.

The erection of the wall of FIG. 4 is accomplished by placing one row of panel units 27 to 29 on a sill 37 which rests on a foundation 38 and is anchored to it in the usual manner; the panel units are secured to the sill by means of foot brackets 39 and bolts 40; the facing panel unit row 30 to 32 is then placed in position and in alinement of its stringers with those on the former row, and the keys 36 are telescoped into engagement with the stringers so alined; sealing strips 41 are included between each two adjoining panel units at the time of their placement in position on the sill.

Another type of stringers, known as the "box" type, is in evidence in the union of FIG. 5, and includes a base 44 under each stringer as its attaching means to an appertaining panel, and lateral walls such as 45 standing on it and supporting a cross-web 46 with a frontal longitudinally mortised face; the interlocking key 47 is formed with plural reentrant tenons on both of its faces, and with half-tenons such as 48 along its edges in the manner as shown on only one side of the key in FIG. 2.

In contrast to the relatively wide stringers in the preceding union, those in the structure of FIG. 6 are narrow and the mortised cross-web 49 on them is supported by a single wall 50 rising from a base 51; while the intermediate stringers 52 have a symmetrical profile, the edge stringers 53 may have their supporting wall 54 located in the same manner, or next to the parting plane as shown; the conjoining instrumentalities on the edge stringers consist of two half-mortises such as 55 along the edges of the frontal face, one of which combines with a like half-mortise on the companion edge stringer 53a for the engagement of one key tenon while the other one interfits with a marginal half-tenon on the key 56.

The three following FIGS. 7 to 9 represent structural unions in which tenoned keys with distinctive profiles interlock the stringers therein into unity; in FIG. 7 not only the stringers but also the key 57 are fabricated of rolled sheet material; the key is made up of two identical strips corrugated in a dovetail manner and secured permanently together face-to-face so that a central web of double the thickness of the sheet stock results and on it bilaterally run longitudinal tenons with reentrant flanks.

The tenons 58 on the key 59 in FIG. 8, and the tenons 60 on the key 61 in FIG. 9 are of a square and a round profile, respectively; the former ones are placed in a diagonal position and are attached to the key web by a narrow neck so that two of their sides function as reentrant flanks, as do the corresponding sides in the stringer mortises; in the latter case the arcuate sides of the tenons and mortises function in the same manner.

A wall such as the one in FIG. 4 must necessarily intersect or be joined into continuity with other walls in order to complete a building such as a compartmented house, and FIG. 10 illustrates a manner of effecting such junctures by means of stringers with geometrical modifications of their profile; a right-angle union between two panel units, such as 62–63, is obtained in the same manner as in a coplanar relationship, i.e., by respective edge stringers 64–64a on the panel units and by forming them with flanges 65 in an angular, in this case a 135 degree deviation from their supporting walls 66; the resultant stringers abut each other in juxtaposition at a bisecting plane through the corner parting line and their mortised frontal face lies diagonally to both panel units; such diagonally directed stringers fall into an opposed alinement either with other stringers, either normal, or modified, or even of their own kind, or with special structural or stress members, in order to produce L and T intersections in the walls.

At the L intersection in FIG. 10, the outer surface of the wall is formed by panel units 67 and 68 at right angles to each other, and by a tubular member 69 which occupies the quadrantal corner space between them and provides an exterior segment in continuity with them; these panel units bear respective edge stringers 70 and 71 with diagonally inclined cross-webs and frontal mortised faces 72 thereon in coplanar alinement with each other; the member 69 abuts with its radial walls 73 both of these stringers and beyond the juncture of these walls carries a longitudinal tenon with reentrant flanks; in the assembled relationship, this tenon fits between and complements the stringers 70 and 71 in providing a single mortised face corresponding and proximate to that on the inner edge stringers 64–64a; a single tenoned key 74 interlocks all four stringers as well as the member 69 into a unitary stress member.

At the T intersection, diagonally directed edge stringers 64b–64c on respective right-angle panel units 75–76 project to the center of the intersection as do juxtaposed edge stringers 64d–64e on panel units 77–78; an outer panel unit 79 is continuous through the intersection, and includes a stringer 80 of the intermediate type the crossweb 81 of which is peaked and its angular faces are mortised longitudinally, and are each in a confronting and proximate relationship to the faces on each pair of stringers 64b–64c and 64d–64e; keys 74a and 74b interfit with both sets of the stringers as well as with the stringer 80 and thus secure all five stringers and their panel units together.

At locations apart from the intersections in this structure, intermediate stringers such as 82b and paired edge stringers such as 83–83a are in a random opposed alinement with one another, and are locked into unity to conjoin their panel units 79–84 and 78 with one another relatively immovably and, moreover, to function as studs in the walls so created. Sealing strips 85 are included between all juxtaposed edge stringers, or between edge stringers and associated members such as the corner post 69.

In the foregoing structures and keyed unions, stringers on one or more panel units are in opposed alinement and are interlocked with stringers on other panel units, or with individual members such as the post 69 in FIG. 10, as their associated components; such stringers can also have as their associated components predominantly or exclusively individual structural members and, furthermore, two or more rows of panel units and stringers thereon can be associated with such members; the significance of this configuration lies in that, even though opposedly alined stringers in conjunction with the key interlocking them function as most effective stress members, for heavy loads such as prevail in lower floors of buildings, for instance, individual studs may be preferable, and in other applications individual beams, girders, spars, etc., interjacent two panel unit rows, or joists or rafters associated with only one panel row, may be more advantageous as stress members than stringers alone; FIGS. 11 to 22 represent embodiments with individual stress members associated with stringers on one or more rows of panel units.

Figure 11:
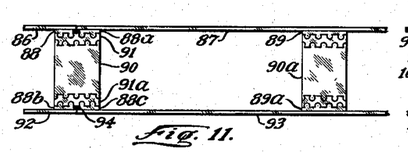
FIG. 11 is a portion of a structure in which stress members extending interjacent facing panel rows are interlocked with edge and intermediate stringers thereon by tenoned keys the tenons on which are staggered and have concave flanks.

In the structure of FIG. 11 one row of panel units 86–87 is provided with edge stringers 88–88a and with intermediate stringers such as 89, both kinds of which are in opposed alinement with and proximate to individual stress members 90 and 90a, and are interlocked with them by keys 91 of a tenoned profile in engagement with mortise and tenon formations on both the stringers and the stress members; another row of panel units 92–93 runs in the proximity of and is conjoined with the opposite profile extremities of the stress members 90 and 90a by stringers 88b–88c and 89a, and by keys 91a; sealing strips 94 are lodged between the edge stringers.

Figure 12:
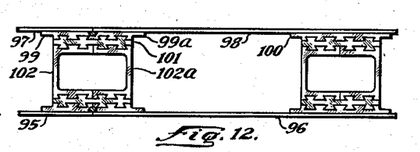
FIG. 12 is a structure similar to the preceding one, the stress members in this case being made up each of two channel sections which jointly form a hollow member.

In a similar structure in FIG. 12 two facing rows of panel units 95–96 and 97–98 with stringers 99–99a and 100 thereon are integrated into unity with tubular stress members by means of tenoned keys 101; each one of these members is made up of two channel shapes 102–102a the flanges of which have equidistant mortises with reentrant flanks running lengthwise in their outer faces. In this one and all the other embodiments employing individual stress members, it is essential to have the stress resisting material in the members, keys, and stringers concentrated as far away from the neutral axis of the structure as feasible, and consequently the stringers are reduced in height to a minimum compatible with their function as auxiliary stress members and as the carriers of the interlocking means for the panels.

Figures 13, 14, 15, 16, 17, 18, 19, 20, 21, 22:
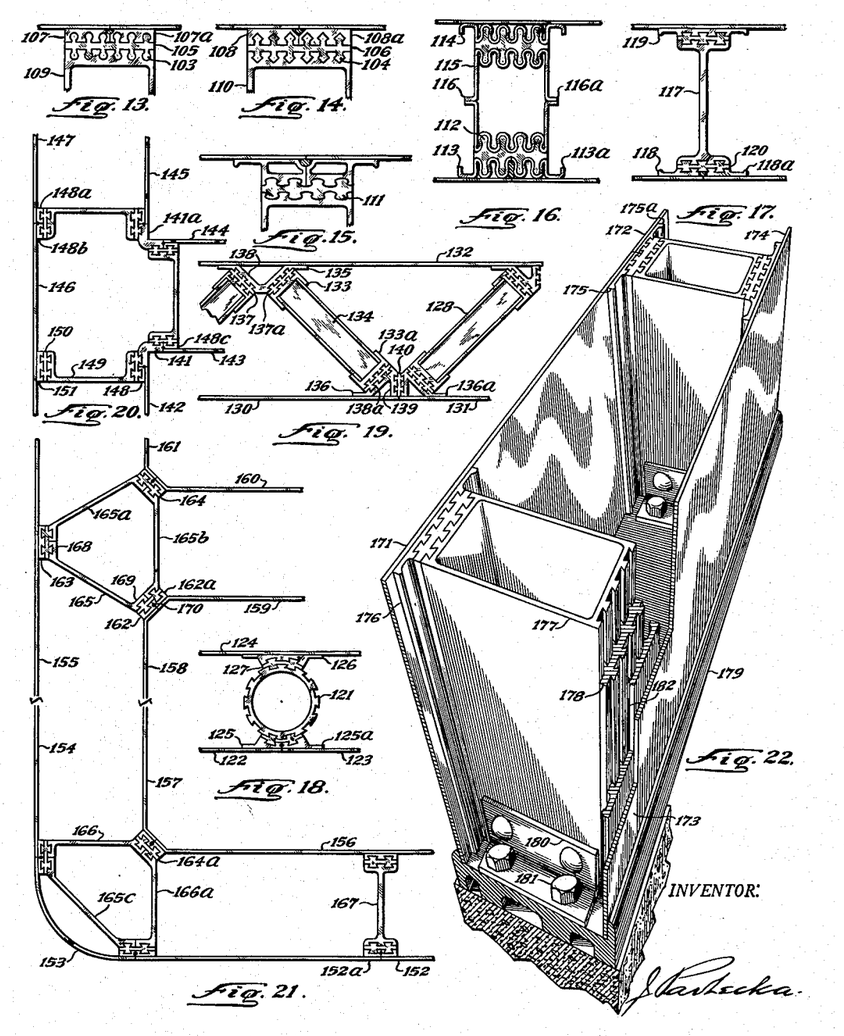
FIGS. 13 and 14 represent tenoned keys with round and square tenons, respectively, interfitted with stringers and their associated members.
FIGS. 15 and 16 show tenoned keys with bulbous tenons of a stub and an elongated shape, respectively, in engagement with mortises of like shapes in stringers and members associated therewith.
FIGS. 17 and 18 are structural unions in which the components include an I-beam and a round beam, respectively, the latter having a mortised periphery.
FIG. 19 is a portion of a structure such as a floor in which stress members between facing panel unit rows are arranged as lattices of a diagnoal truss, and individual tenoned keys interlock each two edge stringers with one another.
FIG. 20 is a plan view of a T intersection in a wall constructed of studs of a channel shape, panel units with stringers thereon, and corner stiles between right-angle panel units.
FIG. 21 is a plan view of a wall structure consisting of straight runs and of L and T intersections between them, with a number of studs forming a column at each intersection.
FIG. 22 is a "bird's eye" view of a straight run of a wall showing the mounting of the studs on a sill and facing rows of panel units secured to one another and to the studs by tenoned keys.

As documented in a number of the preceding figures, the profile of the key tenons can be of any shape that has reentrant flanks, and FIG. 11 shows another example of such a profile with inwardly retrorse flanks; other such profiles are represented in FIGS. 13 to 16 in unions employing individual stress members; in FIGS. 13 and 14 round and square tenons 103 and 104 on keys 105 and 106 therein interfit with mortises of corresponding profiles in stringers 107 and 108 in paired juxtaposition on adjoining panel units, and in stress members 109 and 110, respectively, these members may function as joists in floors. In FIGS. 15 and 16 bulbous tenons 111 and 112 of a stub and an elongated shape, respectively, engage mortises in the stringers and stress members associated with one another therein; the stringers 113–113a and 114 as well as the member 115 are of rolled origin, the body of the member being made up of two identical open halves each of which has the profile of and amounts to a stringer and is joined—instead of a panel—to its companion half by its attaching flanges 116–116a.

A type of stress member commonly used is an I-beam, and FIG. 17 shows such a beam 117 with its outer faces mortised longitudinally and in confronting proximity to like faces on edge stringers 118–118a and on an intermediate stringer 119, and being interlocked with them by keys such as 120.

A stress member possessing considerable universality is the round beam or stud 121 of FIG. 18 the periphery of which has equidistant mortises with reentrant flanks running longitudinally in it; this member is interposed between panel rows 122–123 and 124 concentrically with arcuate mortised faces on stringers 125–125a and 126 so that it is spaced from these faces by a constant gap; keys 127 having a web of an annular tenoned profile are telescoped into this gap and into the mortises along it.

For sustaining severe surface loads in such structures as floors and roofs a diagonal truss is often employed, and FIG. 19 shows individual beams 128 disposed as lattices of a truss between panel unit rows 130–131 and 132; each beam is made up of two caps such as 133 and intervening channels or webs 134 straddled by them; the proximate profile ends of each two beams are interlocked with one intermediate stringer 135, or with juxtaposed edge stringers 136–136a, by two tenoned keys 137 and 137a, for which purpose these stringers are formed with convergently inclined faces on walls such as 138; these faces as well as the beam caps 133 have longitudinal mortises with reentrant flanks running in them, are in confronting proximity of one another, and jointly engage one of the keys. Each edge stringer carries one such inclined face 138a, and laterally to the parting plane and proximate to it has a wall 139 with a mortised face by means of which it engages a tenoned key 140 in conjunction with its twin edge stringer.

For conjoining panel units with one another as well as with a stress member in relationships other than coplanar, transition members with two or more angular mortised faces may be employed to function as substitutes for panel units at corners in the manner of the post 69 in the structure of FIG. 10; a stile 141, basically the same as the member 69, is employed in the structure of FIG. 20 as a corner post between right angle panel units 142 and 143, and 144 and 145, which form the inner surfaces of a T intersection between walls; these panel units as well as panel units 146–147 forming the outer surface are provided with edge stringers 148 which serve for conjoining them in a coplanar relationship as the stringers 148a–148b do, or in a right angle relationship through the medium of the stile 141 in juxtaposition with stringers 148 and 148c. Studs 149 which lie interjacent the facing panel rows have longitudinally mortised outer faces through which they are interlocked by keys 150 with either one intermediate stringer 151, or with two juxtaposed edge stringers 148a–148b, or with one edge stringer 148 and one face of the stile 141.

Intersections in a wall constructed of stress members, panel units and stringers on them without auxiliary posts characterize the embodiment of FIG. 21 in which an outer panel unit row 152 to 155 is correlated with inner panel unit rows 156 to 159, and 160–161, to produce L and T intersections and straight runs such as occur in any compartmented structure; the panel units in the inner rows meet with one another at parting lines at those intersections while panel units 153 and 155 in the outer row are continuous through them; the panel units are provided with edge stringers such as 162 and intermediate stringers such as 163, all of which as well as studs of three profiles 165, 166, and 167 are in joint engagement with keys 164 of a two-sided inclave or tenoned shape; the studs may have the basic profile of any of those disclosed in the preceding figures, their distinguishing feature residing in that the mortised faces on their profile extremities, such as 168 and 169 on the stud 165, are directed angularly so that they fall into a coplanar alinement with those on two other studs at each intersection, and are interlocked with a stringer or stringers on an associated panel unit or units by one key, such as 164; the three studs held in unity by three keys at each intersection in this manner constitute a tubular triangular column. Similarly, the inner panel units meeting at corners have their marginal portions bent into a coplanar alinement with one another so that the juxtaposed edge stringers on them, such as 162–162a, side-by-side confront and are interlocked with two of the studs, 165–165a in this instance; sealing strips 170 are imbedded between the edge stringers and their panel units so locked into unity.

A portion of a straight run in a wall such as may be a part of either one of the structures of FIGS. 20 or 21 is shown in FIG. 22; it includes facing rows of panel units 171–172 and 173–174 bearing edge stringers 175–175a at parting lines and intermediate stringers 176 apart therefrom; these parting lines may be coincident with one another at certain locations, or non-coincident at others, pursuant to the principle of equivalency between two edge stringers and an intermediate one, as disclosed and documented in this as well as many of the preceding figures. Intervening between the panel units and in opposite alinement with their stringers are studs 177, and they as well as the stringers are in a slidable engagement with tenoned keys 178; by mere duplication of these components and of some of those disclosed in either one of the two preceding figures complete dwellings or other structures can be erected.

The erection of such a structure includes as its steps setting up the studs 177 in their places on a sill 179 anchored to a foundation in the usual manner, and securing them to it by foot brackets 180 and bolts 181; then the panel units are placed in position on the sill, with sealing strips 182 lodged between them, and are secured to the studs and simultaneously locked to one another at the parting lines and the strips 182 between them subjected to compression as the keys 178 are telescoped into their places.

I claim:
1. In a structure, a number of structural members in lateral association with one another, other structural members extending in lateral association with one another at a distance from said first members, a linear key interjacent said distanced members, said key having a central web and having reentrant lengthwise mortise-and-tenon formations on both sides thereof, each of said number of structural members having a wall means extending thereon and reaching to one of said key sides, and each of said other structural members having a wall means extending thereon and reaching to the other one of said key sides, said wall means at each key side bearing reentrant mortise-and-enon formations jointly complemental to one another and to said key side formations and being in a slidable interfit with said formations and said key web being in contiguity of said sides thereof with said wall means reaching thereto for relative immobility therewith.

2. In a structure, a panel, two structural members coextensive at a distance with one side of said panel, said members having coplanar faces thereon next to each other turned toward said panel and having each a minimum total of one reentrant lengthwise mortise in the face thereof, a stringer extending on said panel, said stringer bearing a face in confronting proximity of said structural member faces and having a minimum total of two reentrant lengthwise mortises therein, and a linear key having a central two-faced web and a minimum total of two reentrant lengthwise tenons on each face thereof, said key web being face-to-face with said stringer and structural members and in a mortise-and-tenon slidable interfit therewith.

3. In a structure, a panel, structural members coextensive at a distance with said panel at and along two edges thereof, each of said members bearing a face turned toward said panel and having a number of reentrant lengthwise mortises therein, stringers extending on said panel at and along said edges thereof, said stringers bearing each a face in confronting proximity of said structural member face thereat and having a number of reentrant lengthwise mortises in said face, and a linear key having a central two-faced web and a number of reentrant lengthwise tenons on each face thereof, one such key being face-to-face with said web thereof of each confronting stringer and structural member and in a mortise-and-tenon slidable interfit therewith.

4. In a structure, components and their relationships as set forth in claim 3, structural members coextensive at a distance with said panel at intervals apart from said members at said panel edges, each of said structural members bearing a face turned toward said panel and having a number of reentrant lengthwise mortises therein, and stringers extending on said panel and bearing each a face in confronting proximity of one of said structural member faces and having a number of reentrant lengthwise mortises therein, one of said linear keys being face-to-face with said web thereof of each confronting stringer and structural member and in a mortise-and-tenon slidable interfit therewith.

5. In a structure, a panel unit, a structural member coextensive at a distance with one side of said panel unit, wall means extending on said panel unit and reaching toward said structural member, said panel unit wall means and said structural member bearing faces in confronting proximity of each other and having said faces mortised reentrantly lengthwise, and a linear key having a central web and having plural tenons on both sides thereof, said key being in a slidable mortise-and-tenon interfit with said wall means and structural member faces and said key web being in contiguity with said faces for relative immobility therewith.

6. In a structure, two panels facing each other at a distance to form a hollow wall or body, stringers extending on said panels in opposition with one another at and along the limits of said panels, stringers extending on said panels in opposition with one another at spaced intervals apart from said panel limits, said stringers in opposition having frontal extremities in confronting proximity of each other, said stringer extremities having each plural reentrant lengthwise mortises therein, and linear keys having each a central web and plural reentrant lengthwise tenons on each side thereof, one of said keys being in contiguity of the sides thereof with each two of said confronting stringer extremities and in a mortise-and-tenon slidable interfit therewith.

7. In a structure, two panel units in a spaced apart facing relationship, opposed wall means extending on said panel units and intermediate thereof bearing faces in confronting proximity of each other and having reentrant lengthwise mortise-and-tenon formations in said faces, and a linear key having a central web and having mortise-and-tenon formations on both sides of said web, said key being in a slidable mortise-and-tenon interfit with said opposed wall means faces and said key web being in contiguity with said faces for relative immobility therewith.

8. In a structure, two panels facing each other in a spaced apart relationship, stringers extending on said panels in opposition to each other, said stringers bearing frontal faces and marginal corners thereon and being in proximity of each other at said faces, said stringer faces having each a number of reentrant lengthwise mortises therein, and a linear key having a central web and a number of reentrant lengthwise tenons on both sides thereof, said key being in a slidable engagement of said tenons thereof with said mortises in said stringer faces and said web thereof providing a full-width base for abutment of said stringers at said corners thereof in holding said stringers together as a unitary stress member.

9. In a structure, two panels facing each other in a spaced apart relationship, stringers extending on said panels in opposition to each other, said stringers bearing frontal faces in proximity of each other, said stringer faces having each marginal reentrant lengthwise half-mortises and a number of reentrant lengthwise mortises therebetween, and a linear key having a central web and having marginal reentrant lengthwise half-tenons and a number of reentrant lengthwise tenons therebetween on both sides thereof, said key being in a slidable engagement of said half-tenons and tenons thereof with said respective half-mortises and mortises in said stringer faces for locking said stringers together close to the full width thereof into a unitary stress member.

10. In a structure, two panels facing each other in a spaced apart relationship, a structural member extending interjacent said panels at a distance therefrom, stringers extending on said panels and therefrom reaching toward said structural member, said structural member and each of said stringers bearing faces thereon in proximity of each other, each of said faces having a number of reentrant lengthwise mortises therein, and two linear keys having each a central web and a number of reentrant lengthwise tenons on both sides thereof, one of said keys being in a slidable engagement of said tenons thereof with said mortises in each pair of said proximate structural member and stringer faces and being in contiguity of said web thereof with said faces for locking said member and stringers together relatively immovably as a unitary stress member for holding and supporting said panels in said relationship thereof.

11. In a structure, a number of panels forming a portion of a hollow wall, a structural member extending in said wall at a distance from said panels, said structural member having a circular periphery and having reentrant lengthwise mortises evenly spaced in said periphery, a stringer extending on each of said panels and therefrom reaching toward said structural member and bearing a segmental arcuate face in proximity of said structural member periphery and concentrically therewith, said stringer face having a number of reentrant lengthwise mortises therein, and linear keys having each a central web shaped as a portion of an annulus and having reentrant lengthwise tenons on both sides thereof, each of said keys being in a slidable engagement of said tenons on one side thereof with a corresponding number of said mortises in said structural member and on the other side thereof being in a slidable engagement of said tenons thereof with said mortises in at least one of said stringers.

12. In a structure, two panels meeting with each other at a parting line, a structural member bearing a frontal face distantly along said parting line and having a number of reentrant lengthwise mortises therein, stringers extending on said panels at and along said parting line and bearing coplanar faces frontally thereon and having a number of reentrant lengthwise mortises therein, said stringers' faces jointly providing an equivalent of said structural member face and of said number of mortises therein and being in confronting proximity thereof, and a linear key having a central web and having reentrant lengthwise tenons on each side thereof, said key being in contiguity of the sides thereof with said confronting stringer and structural member faces and being in a mortise-and-tenon slidable interfit therewith.

13. In a structure, two panels meeting with each other at a parting line, two or more of structural members in association with one another along one side of said panels at a distance from said parting line therein, said structural members bearing faces next to each other turned toward said panels and having a number of reentrant lengthwise mortises therein, stringers extending on said panels in juxtaposition with each other at and along said parting line therein, said stringers bearing faces in confronting proximity of said structural member faces and having a number of reentrant lengthwise mortises therein, and a linear key having a central relatively thin web and having a number of reentrant lengthwise tenons on each side thereof, said key being in a slidable interfit of the sides thereof with said structural member and stringer mortised faces and said key web providing a base for abutment of said faces against said key.

14. In a structure, two panel units meeting with each other at a parting line, a linear key having a central web and having reentrant lengthwise mortise-and-tenon formations on at least one side thereof, said key facing said panel units with said side at a distance from said parting line, said panel units having wall means extending thereon at and along said parting line, said wall means bearing faces jointly contiguous with said key side and having mortise-and-tenon formations in said faces complemental to each other and in a slidable interfit with said key formations.

15. In a structure, two panels meeting with each other at a parting line, a linear key having a central web facing said panels with one side thereof at a distance from said parting line and having plural reentrant lengthwise tenons on said side, and stringers extending on said panels at and along said parting line, said stringers reaching to said key and bearing each a profile extremity and marginal corners thereon in contiguity with one half of said key side, said extremity of each stringer having a number of mortises therein and being in a slidable engagement with a corresponding number of said key tenons, said key web providing a common base of abutment for said stringers at said corners thereof with said key for relative immobility therewith and with each other.

16. In a structure, panels meeting with one another at parting lines to form a continuous row, structural members coextensive with said panels, each of said members bearing a face turned toward said panels along one of said parting lines at a distance therefrom and having plural reentrant lengthwise mortises in said face, stringers extending on said panels in juxtaposition with each other at and along said parting lines therein, each two of said stringers in juxtaposition having coplanar faces in confronting proximity of said structural member face thereat and jointly forming an equivalent of said structural member face and of said mortises therein, and linear keys having each a central web and plural reentrant lengthwise tenons on each side thereof, one of said keys being in contiguity of the sides thereof with each two of said confronting structural member and stringer faces and being in a slidable mortise-and-tenon interfit therewith.

17. In a structure, components and their relationships as set forth in claim 16, certain of said panels meeting coplanarly with each other, others of said panels meeting angularly with each other at said parting lines, said stringers in juxtaposition on said angularly meeting panels and said structural members having said faces thereof at right angles to a plane directed diagonally through the parting line thereof.

18. In a structure, components and their relationships as set forth in claim 16, structural members coextensive with said panels at intervals intermediate said panel parting lines, said members bearing faces turned toward said panels and having plural reentrant lengthwise mortises in each face, and intermediate stringers extending on said panels, said stringers having each a face in confronting proximity of one of said structural member faces and having plural reentrant lengthwise mortises therein, said intermediate stringer face and mortises therein being equivalent to the faces and mortises therein on each two of said stringers in juxtaposition for alternative occurrence of said stringers in relation to any of said structural members, one of said keys being in contiguity of the sides thereof with each two of said stringer and structural member confronting faces and in a slidable mortise-and-tenon interfit therewith.

19. In a structure, two panels meeting with each other at a parting line, a third panel coextensive with said panels at a distance from said parting line, a stringer extending on said third panel, said stringer bearing a face along said parting line at a distance therefrom and having a number of reentrant lengthwise mortises therein, stringers extending in juxtaposition with each other on said two panels at and along said parting line therein, said stringers bearing coplanar faces in confronting proximity of said third panel stringer face and jointly forming an equivalent thereof and of said mortises therein, and a linear key having a central web and a number of reentrant lengthwise tenons on each side thereof, said key being in contiguity of the sides thereof with said stringer confronting faces and being in a mortise-and-tenon slidable interfit therewith.

20. In a structure, components and their relationships as set forth in claim 19, said two panels meeting with each other angularly at said parting line therein, and said stringers in juxtaposition and said third panel stringer bearing said faces thereof at right angles to a plane directed diagonally through said panel parting line thereat.

21. In a structure, two panels meeting with each other at a parting line, a third panel extending in a spaced apart relationship to said meeting panels, a structural member extending interjacent said meeting panels and said third panel at a distance therefrom, a stringer extending on said third panel and therefrom reaching toward said structural member, juxtaposed stringers extending on said meeting panels at and along said parting line and therefrom reaching toward said structural member, said structural member and said stringers bearing opposite faces in proximity of each other and having a number of reentrant lengthwise mortises in said faces, said juxtaposed stringers having the faces thereof complementing each other as an equivalent of the third panel stringer face and of said mortises therein, and two linear keys having each a central web and a number of reentrant lengthwise tenons on both sides thereof, one of said keys being in a slidable engagement of said tenons thereof with said structural member and stringer mortises in each pair of said proximate faces thereof for locking said juxtaposed stringers to each other and for locking said stringers and said third panel stringer into a unitary stress member with said structural member and thereby holding and supporting said panels relatively immovably.

22. In a structure, two panels meeting with each other at a parting line, two other panels coextensive with and distanced each from one of said first panels, stringers extending in juxtaposition with each other on said first panels at and along said parting line therein, said stringers bearing coplanar extremities and marginal corners thereon away from said panels and having each a minimum total of one reentrant lengthwise mortise in the extremity thereof, stringers extending one on each of said other panels, said other panel stringers bearing coplanar extremities and marginal corners thereon in confronting proximity of said first panel stringer extremities and having each a minimum total of one reentrant lengthwise mortise in the extremity thereof, and a linear key having a central web and a minimum total of two reentrant lengthwise tenons on each side thereof, said key being in a slidable mortise-and-tenon interfit with said confronting stringer extremities and said key web providing a base of abutment for said extremities at said corners thereof and therebetween.

23. In a structure, panels meeting with each other in two pairs at parting lines, said parting lines being coextensive at a distance with each other, a structural member extending interjacent said two pairs of panels at a distance therefrom, juxtaposed stringers extending one pair on each two of said meeting panels at and along said parting lines and therefrom reaching toward said structural member, said structural member and each two of said juxtaposed stringers bearing faces in proximity of each other and having a number of reentrant lengthwise mortises in said faces, and two linear keys having each a web and a number of reentrant lengthwise tenons on both sides thereof, one of said keys being in a slidable engagement of said tenons thereof with said mortises in each pair of said proximate structural member and stringer faces for locking said juxtaposed stringers to each other and for locking both pairs of said stringers into a unitary stress member with said structural member and thereby holding and supporting said panels relatively immovably.

24. In a structure, a number of panels meeting with one another at parting lines in two spaced apart rows, said parting lines in each row being in a random coincident and non-coincident relationship to those in the other row, intermediate stringers extending on said panels in each row apart from said parting lines, said stringers bearing frontal faces with a minimum total of two reentrant mortises running lengthwise in each face, juxtaposed stringers extending on each two panels at the parting line, said juxtaposed stringers bearing frontal faces thereof, and being complemental to each other in forming jointly an equivalent of one of said intermediate stringer faces and of said minimum total of two mortises therein, said intermediate and said juxtaposed stringers on both panel rows being in a random opposed alinement with one another and in confronting proximity of said faces thereof, and linear keys having a central web and a minimum total of two reentrant lengthwise tenons on each side thereof, said keys being telescoped into contiguity of the sides thereof with said confronting stringer faces and into a mortise-and-tenon interfit therewith.

25. In a structure, panels meeting in continuity with one another at parting lines in two rows distanced from each other, stringers extending on said panels in juxtaposition with each other at and along said parting lines therein, each two of said stringers in juxtaposition having coplanar profile extremities away from said panels thereof and in each extremity having a minimum total of one reentrant lengthwise mortise, said stringers on said panels in both rows being in confronting proximity of said extremities thereof, and linear keys having each a central web and a minimum total of two reentrant lengthwise tenons on each side thereof, one of said keys being in contiguity of the sides thereof with said confronting stringer extremities of each two stringers from both panels rows and in a slidable mortise-and-tenon interfit therewith.

26. In a structure, panels meeting in continuity with one another at parting lines in two rows distanced from each other, intermediate stringers extending on said panels at spaced intervals apart from said parting lines, each of said stringers bearing an extremity away from the panel thereof and having plural reentrant lengthwise mortises therein, stringers based on said panels in juxtaposition with each other at and along said parting lines therein, each two of said stringers in juxtaposition bearing coplanar extremities away from the panels thereof and forming jointly an equivalent of one of said intermediate stringer extremities and of said plural mortises therein, said intermediate stringers and said stringers in juxtaposition on said panel rows being in confronting proximity of said extremities thereof, and linear keys having each a central web and plural reentrant lengthwise tenons on each side thereof, one of said keys being in contiguity of the sides thereof with each two of said stringer confronting extremities and in a slidable mortise-and-tenon interfit therewith.

27. In a structure, panel units in spaced apart rows meeting with each other at parting lines to form a hollow wall, structural members extending interjacent said panel rows at a distance therefrom at intervals apart from each other, said parting lines in each of said panel rows occurring at certain of said structural members in both coincident and non-coincident relationships to the parting lines in the other row, juxtaposed type stringers extending on said panel units at and along said parting lines and reaching jointly toward said structural members thereat, intermediate type stringers extending on said panel units apart from said parting lines and reaching toward said structural members thereat, said structural members and said stringers of both of said types bearing faces thereon in proximity of each other and having reentrant lengthwise mortises in said faces, said faces and mortises therein on each two of said juxtaposed stringers being jointly equivalent to the face and mortises on one of said intermediate type stringers for random occurrence of said parting lines at anyone of said structural members, and linear keys having each a central web and a number of reentrant lengthwise tenons on both sides thereof, one of said keys being in slidable engagement of said tenons thereof with said structural member and stringer mortises in each pair of said proximate faces thereof for locking said juxtaposed type stringers to each other and for locking said stringers of both of said types into unitary stress members with said structural members and thereby holding and supporting said panel units relatively immovably in said rows.

28. In a structure, panels in straight and in angular inner and outer coextensive and spaced apart rows forming hollow walls and at least one corner intersection therebetween, two of said panels in an inner row meeting each other angularly at a parting line at said intersection, two of said panels in an outer row having parting lines distanced from ecah other at said intersection, a quadrantal post complementing said outer row between said panel parting lines, stringers extending in juxtaposition with each other on said inner panels at and along said parting line therein, said stringers having profile extremities away from said panels thereof and jointly providing a face at right angles to a diagonal plane through said panel parting line, said face having a minimum total of two reentrant lengthwise mortises therein, stringers extending on said outer panels at and along said parting lines therein in juxtaposition with said post, said stringers and said post having profile extremities away from said panels and jointly providing a face in confronting proximity of said inner panel stringers' face and providing an equivalent thereof and of said mortises therein and a linear key having a central web and having a minimum total of two reentrant lengthwise tenons on each face thereof, said key being face-to-face with said confronting stringers and post extremities and being in a slidable mortise-and-tenon interfit therewith.

29. A structure including, a number of panel units meeting in coplanar and angular relationships at parting lines in two spaced apart rows to form continuous runs intersecting at corners, said parting lines in said spaced rows being located in certain of said corners and apart therefrom in both coincident and non-coincident relationships with each other, intermediate stringers extending on said panel units in each row apart from said parting lines and bearing frontal faces with a minimum total of two reentrant mortises running lengthwise therein, juxtaposed stringers extending on each two panel units at the parting line thereof, said juxtaposed stringers being complemental to each other in forming an equivalent of one of said intermediate stringer faces and of said minimum total of two reentrant mortises therein, said intermediate and said juxtaposed stringers on said panel rows being in a random opposed alinement with one another as determined by said parting line relationships and said intermediate stringers being in opposed alinement with one another apart from said parting lines, said stringers in alinement with one another being in confronting proximity of said faces thereof, and linear keys having each a central web and a minimum total of two reentrant lengthwise tenons on each side thereof, said keys being telescoped into contiguity of the sides thereof with said confronting stringer faces and into a mortise-and-tenon interfit therewith.

30. In a structure, panels meeting coplanarly and angularly with each other at parting lines in coextensive and spaced apart rows to form hollow walls and intersections therebetween, a panel in the outer row at a number of said intersections being continuous therethrough, intermediate type stringers extending on said panels at intervals apart from said parting lines, juxtaposed type stringers extending on said panels at each of said parting lines in said walls and at said intersections, said stringers of both types on said panel rows bearing frontal faces in confronting proximity of one stringer type with the same type at some locations and of one stringer type with the other type at other locations, said faces on both stringer types having reentrant mortise-and-tenon formations therein, said juxtaposed type stringers on said angularly meeting panels at said intersections standing next to each other at a dividing plane inclined across the intersections, said faces in confronting proximity on said juxtaposed type stringers and on the intermediate type stringer on said continuous panel at said number of intersections being at right angles to said inclined plane, and linear keys having a central web and having reentrant mortise-and-tenon formations on both sides thereof, said keys being in contiguity of said web sides thereof with said confronting stringer faces and in a slidable interfit with said formations therein.

31. A structure including, panel units in spaced apart facing rows forming hollow walls with L and T intersections therein, said panel units in each row meeting one another at parting lines at a right angle at said intersections and in a coplanar alinement at certain of said intersections and apart therefrom, certain of said parting lines in said facing rows being located at certain of said intersections and apart therefrom and being in both coincident and non-coincident relationships with each other, intermediate stringers extending on said panel units apart from said parting lines and bearing frontal faces with a minimum total of two reentrant mortises running lengthwise therein, juxtaposed stringers extending on said panel units at and along said parting lines, each two of said juxtaposed stringers being complemental to each other in forming an equivalent of one of said intermediate stringer faces and of said minimum total of two reentrant mortises therein, said intermediate and said juxtaposed stringers on each panel unit row being in opposition as called for by said parting line relationships and apart from said parting lines with intermediate and juxtaposed stringers on a facing row at certain locations and on facing stringers on a facing row at others, those of said stringers on panel units forming inner rows at said intersections being directed diagonally across said intersections into an opposed alinement with stringers on panel unit rows forming said intersections, said opposedly alined stringers being in confronting proximity of said mortised faces thereof, and linear keys having each a central web and a minimum total of two reentrant lengthwise tenons on each side thereof, said keys being telescoped into contiguity of the sides thereof with said confronting stringer faces and into a mortise-and-tenon interfit therewith.

32. A structure including, panels in straight and in angular inner and outer coextensive and spaced apart rows forming hollow walls and intersections therebetween, certain of said panels at a number of said intersections being continuous therethrough, others of said panels meeting with each other coplanarly at parting lines located in said straight rows and at one or more of said intersections, others of said panels meeting with each other angularly at parting lines located at said intersections, said parting lines in said inner and outer rows being in both coincident and non-coincident relationships with one another, intermediate stringers extending on said panels in both rows at intervals apart from said parting lines therein, said stringers bearing each a profile extremity away from the panel thereof and having one or more faces thereon and having a minimum total of two reentrant lengthwise mortises in each face, stringers extending in juxtaposition with each other on said panels at and along said parting lines therein, each two of said stringers bearing profile extremities away from the panels thereof and jointly providing a face on said extremities equivalent of one of said intermediate stringer faces and of said mortises therein, said intermediate stringers and said stringers in juxtaposition on said inner and outer panel rows reaching into confronting proximity of said faces thereof at said coincident and non-coincident parting lines and apart therefrom, said stringers in juxtaposition on said angularly meeting panels at said intersection reaching into confronting proximity of one or more of said intermediate stringers faces thereat next to a diagonal plane through the parting line thereat and bearing said faces thereon at right angles to said plane, and linear key having each a two-faced web and a minimum of two reentrant lengthwise tenons on each face thereof, one of said keys being face-to-face with each number of said confronting stringers and in a slidable mortise-and-tenon interfit therewith.

References Cited by the Examiner
UNITED STATES PATENTS

| | | | |
|---|---|---|---|
| 1,697,070 | 1/29 | Knight | 72—107 |
| 1,826,127 | 10/31 | Ewing | 72—44 |
| 2,164,138 | 6/39 | London | 72—16 |
| 2,331,752 | 10/43 | Wilson. | |
| 2,356,309 | 8/44 | Garbe. | |
| 2,369,373 | 2/45 | Sheldon | 189—34 |

FOREIGN PATENTS

| | | |
|---|---|---|
| 524,688 | 9/21 | France. |
| 884,329 | 4/43 | France. |
| 173,045 | 12/21 | Great Britain. |
| 466,495 | 10/51 | Italy. |

JACOB L. NACKENOFF, *Primary Examiner.*

WILLIAM I. MUSHAKE, *Examiner.*